United States Patent
Del Favero

(10) Patent No.: US 12,025,263 B2
(45) Date of Patent: Jul. 2, 2024

(54) CUBICLE WALL EXTENDER APPARATUS

(71) Applicant: Michael L Del Favero, San Atonio, TX (US)

(72) Inventor: Michael L Del Favero, San Atonio, TX (US)

(*) Notice: Subject to any disclaimer, the term of this patent is extended or adjusted under 35 U.S.C. 154(b) by 0 days.

(21) Appl. No.: 17/356,087

(22) Filed: Jun. 23, 2021

(65) Prior Publication Data

US 2021/0396352 A1    Dec. 23, 2021

Related U.S. Application Data

(60) Provisional application No. 62/705,353, filed on Jun. 23, 2020.

(51) Int. Cl.
*F16M 13/02* (2006.01)
*E04B 2/74* (2006.01)

(52) U.S. Cl.
CPC ... *F16M 13/022* (2013.01); *E04B 2002/7483* (2013.01)

(58) Field of Classification Search
CPC .......... F16M 13/022; E04B 2002/7483; D06F 55/02; F16B 2/10
USPC ...... 52/38, 36.1; 248/229.26, 229.25, 230.7; 24/508, 489
See application file for complete search history.

(56) References Cited

U.S. PATENT DOCUMENTS

| | | | | |
|---|---|---|---|---|
| 718,291 A * | 1/1903 | Swan | ...................... | B42D 9/005 2/217 |
| 1,303,555 A * | 5/1919 | Haussmann | .......... | F21V 21/088 362/396 |
| 1,492,201 A * | 4/1924 | Carle | ........................ | C14B 1/26 24/457 |
| 5,142,776 A * | 9/1992 | Neely | .................. | H01R 43/005 81/487 |
| 5,765,820 A * | 6/1998 | Marusiak | .................. | B25B 7/00 269/254 R |
| 5,901,993 A * | 5/1999 | Lowery | ...................... | B25B 7/02 294/7 |
| 6,014,942 A * | 1/2000 | Perka | ...................... | G09F 17/00 116/319 |
| 6,098,508 A * | 8/2000 | Battistone | ................. | B25B 7/10 81/416 |
| 6,533,019 B1 * | 3/2003 | King | ...................... | E04B 2/7422 403/396 |

(Continued)

*Primary Examiner* — Christopher Garft
(74) *Attorney, Agent, or Firm* — Outlier Patent Attorneys, PLLC

(57) ABSTRACT

A clip for removably attaching a cubicle wall extension element to a top surface of a cubicle wall includes two elongate arms rotatably coupled together at an attachment portion. Each one of the arms has an upper portion and a lower portion, and the attachment portion is disposed between the upper portion and the lower portion. Each one of the arms also has a first angled portion between the lower portion and the attachment portion, and a second angled portion between the attachment portion and the upper portion. A space between the lower portions of the arms is sized and shaped to fit over the top surface of the cubicle wall. A torsion spring is disposed between the two arms so that the two arms are spring biased to have a resting configuration in which the lower portions of the arms are open and the upper portions of the arms are closed.

9 Claims, 7 Drawing Sheets

(56) References Cited

U.S. PATENT DOCUMENTS

| | | | | |
|---|---|---|---|---|
| 6,835,273 | B1* | 12/2004 | Vargas | B25B 5/06 |
| | | | | 156/290 |
| 8,561,355 | B2* | 10/2013 | Canavarro | E04B 2/7416 |
| | | | | 52/27 |
| 9,409,290 | B1* | 8/2016 | Gordon | B25J 1/04 |
| 9,744,673 | B1* | 8/2017 | Gordon | B25B 5/04 |
| D909,193 | S* | 2/2021 | Canavarro | A47G 5/00 |
| | | | | D8/394 |
| 2005/0160646 | A1* | 7/2005 | DeSalle | G09F 7/08 |
| | | | | 40/606.18 |
| 2009/0224118 | A1* | 9/2009 | Meyers | A47G 29/08 |
| | | | | 248/215 |
| 2012/0285103 | A1* | 11/2012 | Canavarro | E04B 2/7416 |
| | | | | 52/27 |
| 2016/0082574 | A1* | 3/2016 | Robinson | B25B 5/04 |
| | | | | 81/487 |
| 2017/0110039 | A1* | 4/2017 | Jenkins | G09F 17/00 |
| 2019/0085882 | A1* | 3/2019 | Martin | F16B 23/0061 |

* cited by examiner

US 12,025,263 B2

CUBICLE WALL EXTENDER APPARATUS

CROSS-REFERENCE TO RELATED APPLICATIONS

This application claims priority to U.S. Provisional Patent Application Ser. No. 62/705,353, filed Jun. 23, 2020, entitled "CUBICLE WALL EXTENDER APPARATUS," the entire contents of which are incorporated herein by reference.

BACKGROUND

Field of the Art

The present invention relates to an adjustable, temporary cubicle wall extender apparatus that removably attaches to a cubicle wall on one side, and to a variety of extension elements on the other side to extend the height of the cubicle wall.

Discussion of the State of the Art

Currently there are a number of cubicle wall extender devices available on the market to extend the height of a cubicle wall. Some examples of these devices are sneeze guards and extender panels.

Sneeze guards are often pre-made panels with an attachment mechanism to adhere to an existing cubicle wall. These types of sneeze guards cannot be adjusted for size, height, or material preference. If the user wants a more vertical height, he/she does not have a choice to use one. Moreover, the attachment mechanism is designed to work with the sneeze guard only and cannot usually be modified.

Extender panels are also available to extend the vertical height of a cubicle wall. However, extender panels often come with a customized attachment mechanism that cannot be adjusted to accommodate paneling material or size.

Although there are cubicle wall extender devices available in the market, very few, if any, are adjustable to differently sized cubicle walls and few can accommodate extension elements made of different types of materials and sizes. Sneeze guards and extender panels are limited in size, shape and material. Simply put, users who wish to benefit from being able to temporarily attach a variety of extension elements to their existing cubicle walls do not currently have access to such an extension apparatus.

SUMMARY

The present invention relates to an adjustable, temporary cubicle wall extender apparatus which can removably attach to a cubicle wall and to a variety of extension elements to extend the height of the cubicle wall. A typical cubicle wall extender is pre-made and little choice for modification is given to the user. The present invention is a uniquely modified and customized cubicle wall extender apparatus. In one embodiment of the inventive apparatus, the adjustable temporary cubicle wall extender apparatus includes cubicle wall attachment arms, cubicle wall extension element attachment arms, and a spring-biased attachment portion.

In one embodiment of the present invention, the apparatus temporarily attaches to a cubicle wall by straddling the two exterior surfaces of the cubicle wall, extending upward, and clamping onto an extension material vertically, thereby providing additional height to the cubicle wall. It is designed to attach to a cubicle wall and to varying sized paneling material. It benefits users by providing a method of design for extending existing cubicle walls vertically, with varying extension elements, to provide a temporary, higher barrier for individual cubicle users in instances where users may want to limit aerosol particles, noise, light or other matter from entering a cubicle space.

A feature of the present invention is that it is temporarily attached to a cubicle wall and can be removed at the user's discretion. Another feature of the present invention is that it can accommodate extension elements which include various sizes, shapes and materials.

BRIEF DESCRIPTION OF THE DRAWING FIGURES

The accompanying drawing illustrates an exemplary embodiment and, together with the description, serves to explain the principles of the invention according to the embodiment. It will be appreciated by one skilled in the art that the particular arrangement illustrated in the drawing is merely exemplary and is not to be considered as limiting the scope of the invention in any way.

DETAILED DESCRIPTION

Figure 1:
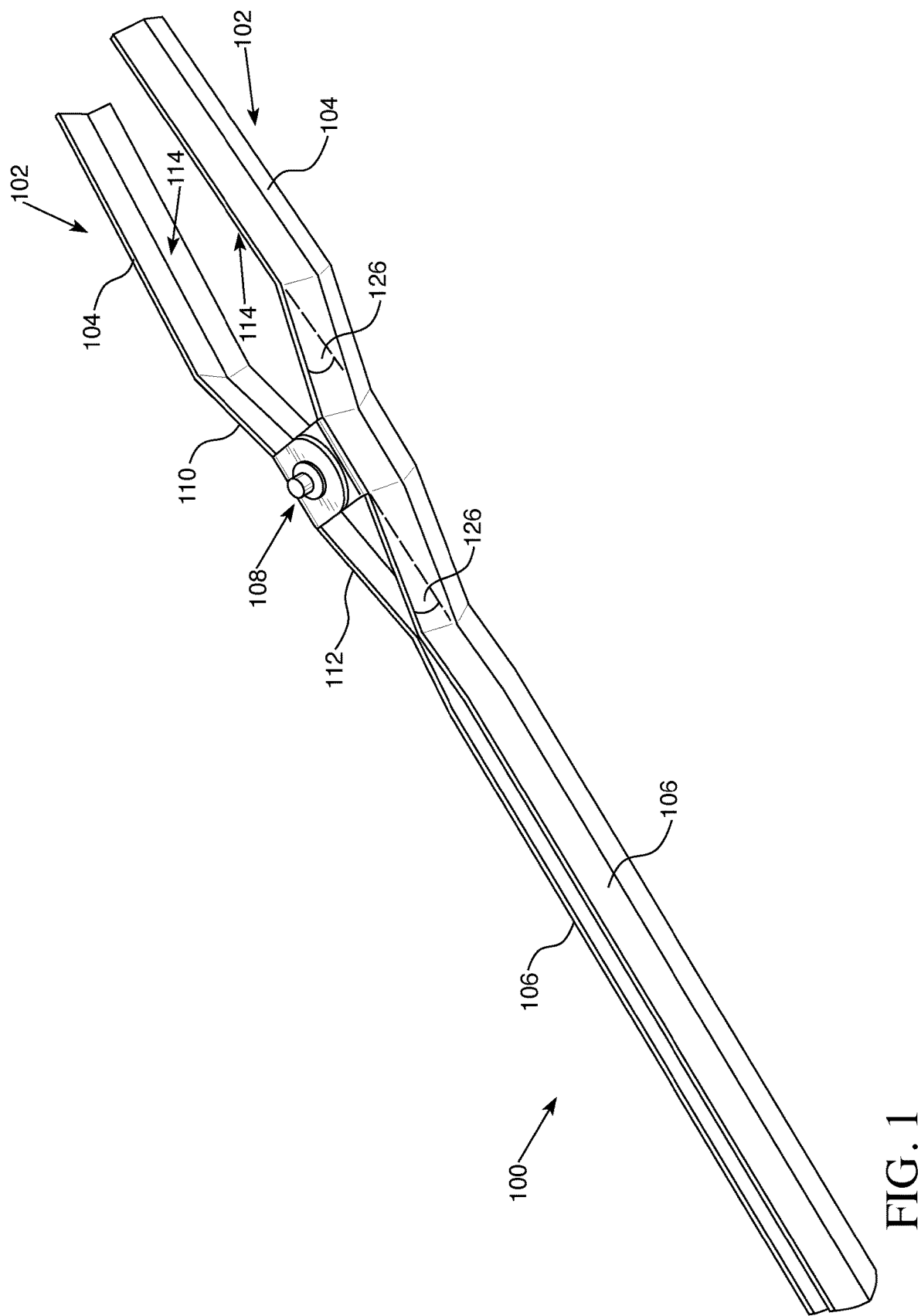
FIG. 1 is a perspective view of a clip of the present invention in accordance with an embodiment of the invention.

The apparatus disclosed herein is an adjustable, temporary cubicle wall extender apparatus which can temporarily attach to a cubicle wall and to a variety of extension elements to extend the height of a cubicle wall. In one embodiment of the inventive apparatus, the adjustable temporary cubicle wall extender apparatus includes cubicle wall attachment arms, cubicle wall extension element attachment arms, and an attachment point therebetween.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application do not, in and of itself, indicate a requirement that the steps be performed in that order. The steps of described processes may be performed in any order practical. Further, some steps may be performed simultaneously despite being described or implied as occurring non-simultaneously (i.e., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially, concurrently or in reverse order, depending on the functionality involved, as would be understood by those having ordinary skill in the art.

Overview

The apparatus of the present invention is a temporary cubicle wall extender apparatus which can removably attach to a cubicle wall and to a variety of extension elements to extend the height of the cubicle wall. In one embodiment of the inventive apparatus, the temporary cubicle wall extender apparatus includes cubicle wall attachment arms on one end, cubicle wall extension element attachment arms on the other end, and an attachment point therebetween. The cubicle wall attachment arms may adjust to fit onto the top of a cubicle wall so that the apparatus can be used on various brands and widths of cubicle partitions. For example, the cubicle wall attachment arms may be made of a material that can be bent into place.

Apparatus

FIG. 1 illustrates the inventive apparatus 100 in accordance with an embodiment of the invention. In particular, FIG. 1 illustrates a clip 100 that is configured to removably attach to a cubicle wall on one side and to a cubicle wall extension element on the other side. The clip 100 includes two elongate arms 102 that are coupled together at an attachment portion 108. Each one of the arms 102 has a lower portion 104 configured to engage directly with a cubicle wall, an upper portion 106 configured to engage with a cubicle wall extension element, and an attachment portion 108 about which the arms 102 may rotate. The clip 100 is made of a rigid, lightweight material. For example, the clip 100 may be made of a metal such as aluminum or steel, hard plastic, fiberglass, wood, or the like. The clip 100 may be made of a material that can be bent into a desired position so that the lower portions 104 can be bent into position to fit snugly around the top of a cubicle wall.

Each one of the arms 102 includes a first angled portion 110 between the lower portion 104 and the attachment portion 108. Each one of the arms 102 further includes a second angled portion 112 between the attachment portion 108 and the upper portion 106. In this manner, the arms 102 are angled towards each other between the lower portions 104 and the upper portions 106.

The elongate arms 102 are coupled to each other with a spring disposed between them. As such, the arms 102 are spring biased to have the upper portions 106 substantially touching each other and the lower portions 104 having a space 114 between them. That is, the clip 100 has a resting configuration in which the upper portions 106 are in contact with each other along substantially their entire length in a closed position, and the lower portions 104 have a space 114 between them in an open position. FIG. 1 depicts the clips 100 in the resting configuration.

The upper portions 106 of the arms 102 are long enough to hold a cubicle wall extension element in a stable position. As such, the length of the upper portions 106 may depend on the size and weight of the cubicle wall extension elements. In general, the upper portions 106 of the arms 102 may be about 12 to 18 inches long.

The lower portions 104 of the arms 102 are long enough to hold the clips 100 and the cubicle wall extension elements in a stable position on top of a cubicle wall. In general, the lower portions 104 of the arms 102 may be about 5 to 8 inches long. Further, the arms 102 may be made of a material, such as aluminum, that can be bent into a desired position. In this manner, the lower portions 104 can be bent towards the cubicle wall to ensure a snug fit around the top of the cubicle wall. As such, the clip 100 is adjustable to accommodate various brands and widths of cubicle walls.

The upper portions 106 and the lower portions 104 are substantially parallel to each other. That is, the lower portions 104 each lie in a plane that is substantially parallel to the plane of the upper portions 106. The first angled portions 110 and the second angled portions 112 are at an angle 126 relative to the lower portions 104 and the upper portions 106. The angle 126 may be between about 20 degrees and about 40 degrees.

The space 114 between the lower portions 104 is sized and shaped to accommodate the top of the cubicle wall. As such, the size and shape of the space 114 is dependent on the size and shape of the cubicle wall. In general, the distance 114 between the lower portions 104 (i.e., the width of the space 114) may be about 1.5 to 3.75 inches. The lower portions 104 may be bent towards or away from each other to narrow or enlarge the space 114 to ensure a snug fit around the top of the cubicle wall.

Figure 2A:
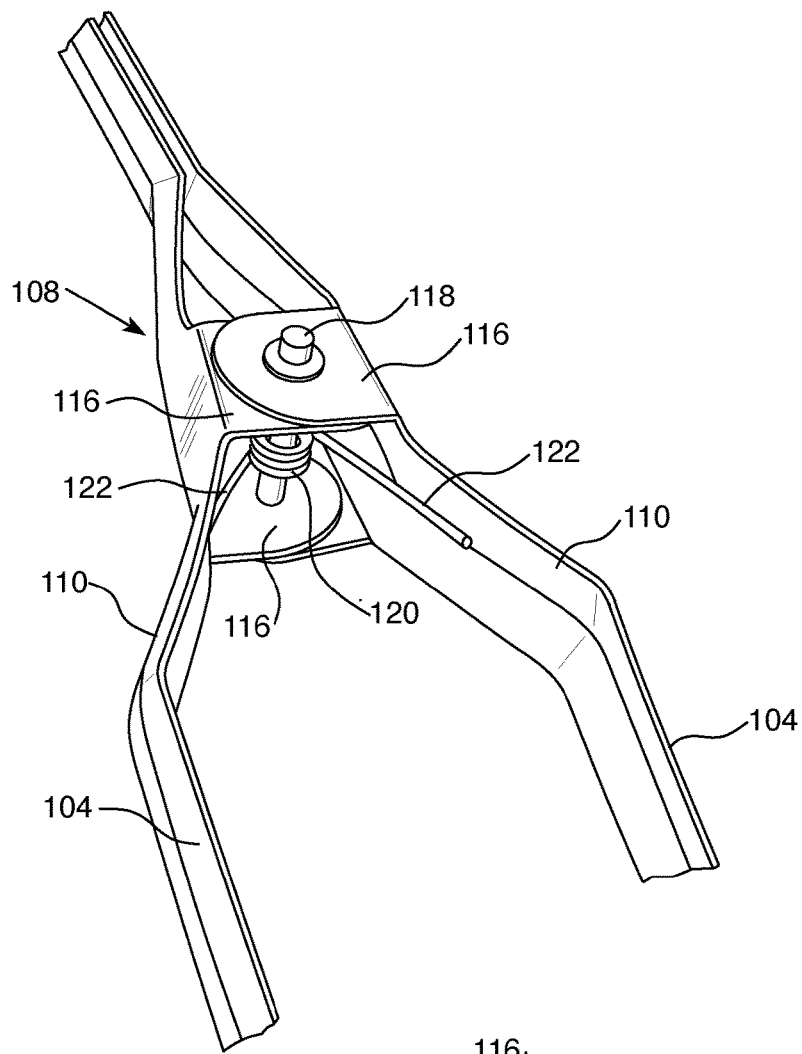
FIGS. 2A and 2B are detailed views of an attachment portion of a clip in accordance with one embodiment of the present invention.
Figure 2B:
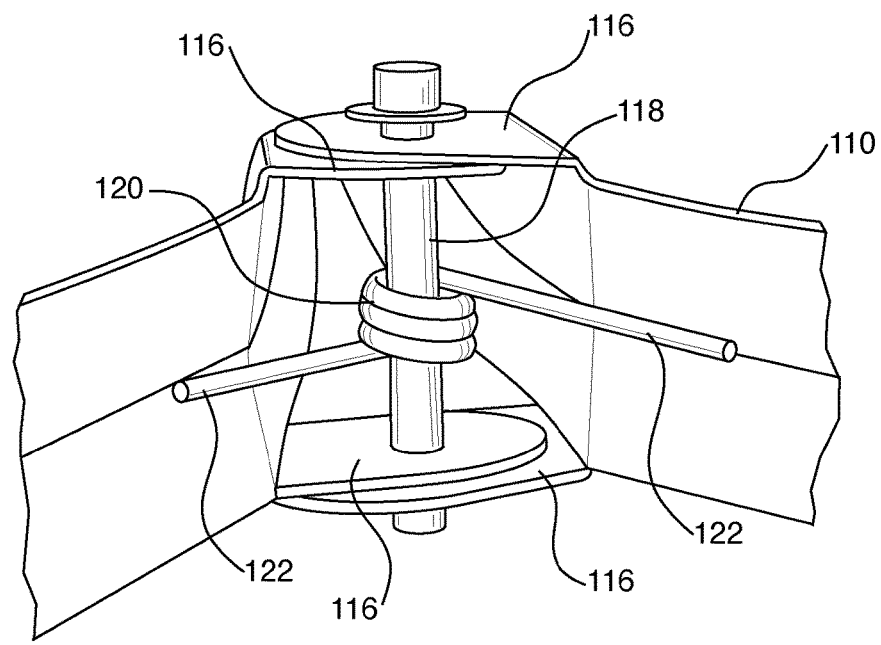

One embodiment of the attachment portion 108 is shown in more detail in FIGS. 2A and 2B. The attachment portion 108 of each arm 102 includes two protruding tabs 116. One tab 116 is on each side of the arm 102. The tabs 116 include holes and the arms 102 are attached together by positioning the holes in alignment with each other and positioning a screw, bolt, pin, or shaft 118 through the aligned holes. The attachment portion 108 further includes a torsion spring 120 having a helical portion with a central opening through which the shaft 118 passes. The shaft 118 is coupled to the two elongate arms 102 in a manner that allows the arms 102 to rotate relative to the shaft 118. The torsion spring 120 further includes spring legs 122 that engage with the first angled portions 110 of the arms 102 in a manner that presses the lower portions 104 away from each other. In this manner, the clip 100 is spring biased to be open in the lower portion 104 of the clip 100 and closed in the upper portion 106 of the clip 100.

Figure 3B:
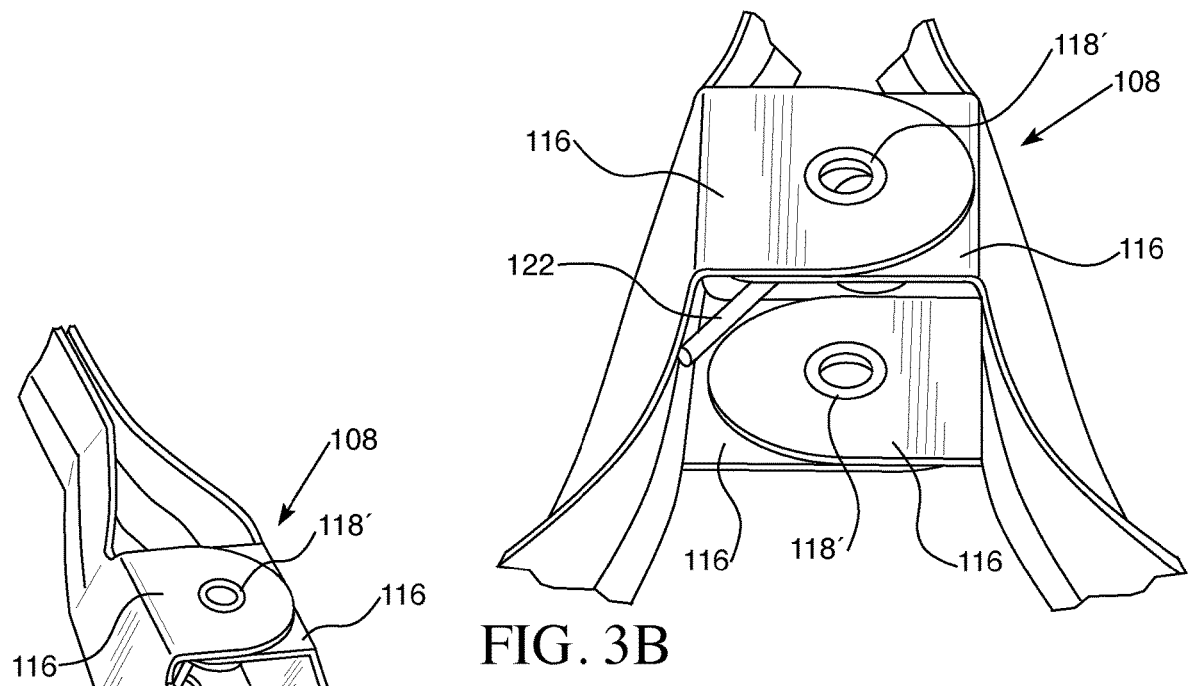
FIGS. 3A-3C are detailed views of an attachment portion of a clip in accordance with another embodiment of the present invention.
Figure 3A:
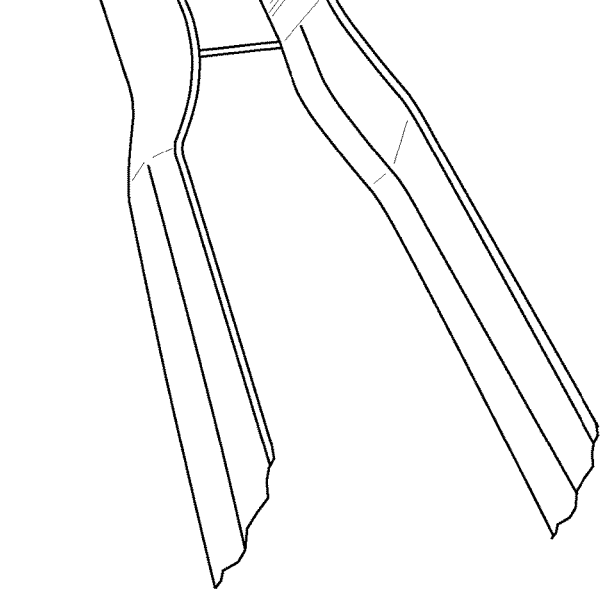
Figure 3C:
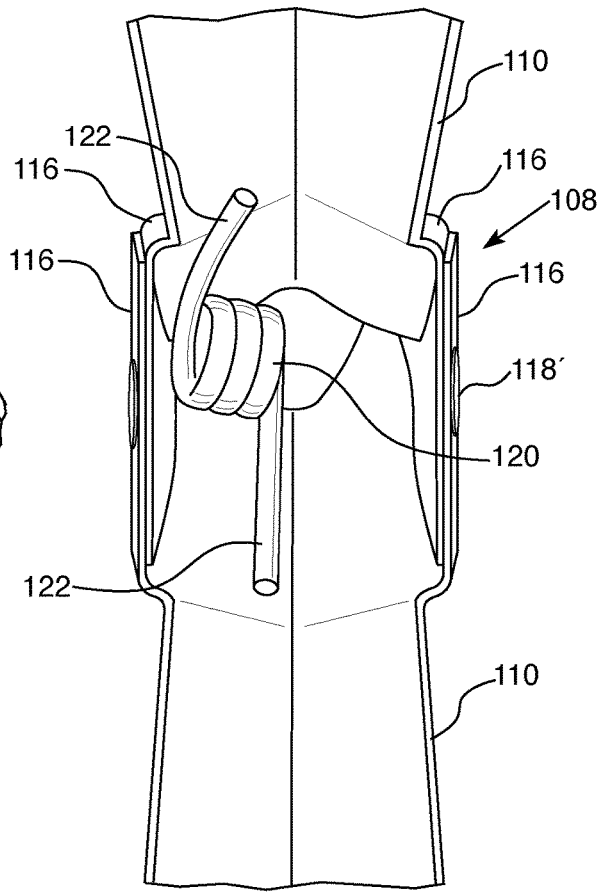

In another embodiment, shown in FIGS. 3A-3C, the attachment portion 108 includes rivets 118' rather than a bolt 118. The rivets 118' are coupled to the through holes in the tabs 116 in a manner that allows the arms 102 to rotate relative to each other around the attachment portion 108, and, more particularly, around the rivets 118'. The spring 120 disposed in the attachment portion 108 is held in place by a friction fit. Alternatively, the arms 102 may include an inner protrusion that engages with the legs 122 of the spring 120 to hold the spring 120 in place.

FIGS. 4-7 depict the clips 100 in use with the lower portions 104 of the clips 100 fitting snugly around the top of a cubicle wall 132 and the upper portions 106 of the clips 100 being in a clamping engagement with cubicle wall extension elements 134. The cubicle wall extension elements 134 may be Plexiglas, acrylic, wood, plastic or other material as would be apparent to one skilled in the art.

In order to install the clips 100 on the cubicle wall 132, pressure is applied to one or both of the lower portions 104 so that the lower portions 104 rotate around the attachment portion 108 towards each other and the space 114 between them gets narrower. The pressure applied to the lower portions 104 creates a space between the upper portions 106. Next, the cubicle wall extension element 134 is positioned in the space created between the upper portions 106. After the cubicle wall extension element 134 is positioned between the upper portions 106, the pressure on the lower portions 104 is released and the upper portions 106 are spring biased back towards a closed position, thereby clamping the cubicle wall extension element 134 between them. The clips 100 and the cubicle wall extension element 134 are then removably coupled to the cubicle wall 132 by positioning the lower portions 104 around the top of the cubicle wall 132 in a straddling position. That is, the top of the cubicle wall 132 is positioned in the space 114 between the lower portions 104 of the clip 100. If necessary, the lower portions 104 of the clip may be bent towards or away from each other to adjust for the width of the cubicle wall 132. In this manner, the lower portions 104 are crimped around the top of the cubicle wall 132 and the apparatus can be used on a variety of brands, types, and widths of cubicle wall partitions.

Figure 4:
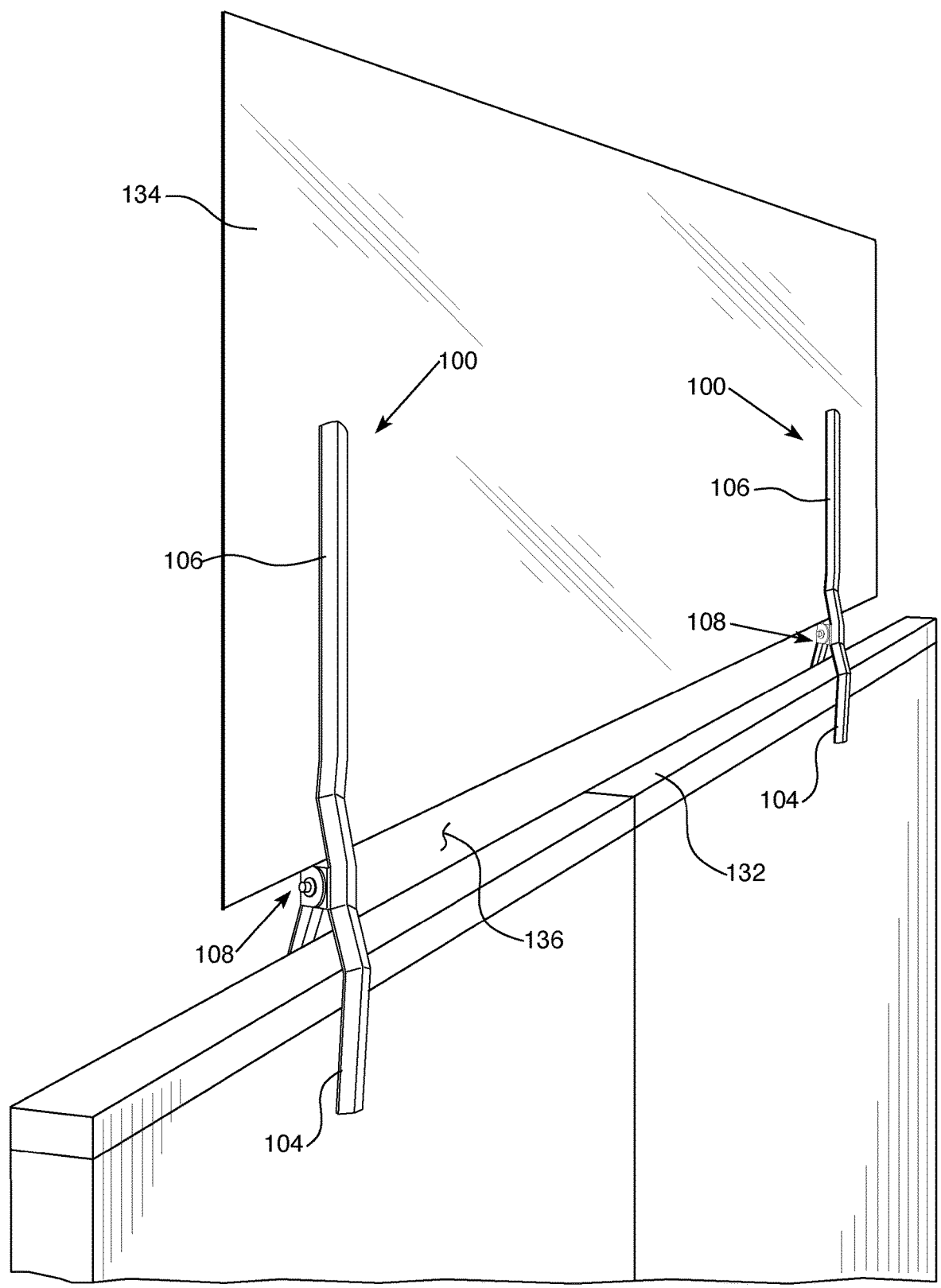
FIGS. 4-7 illustrate a cubicle wall extension element removably coupled to a cubicle wall using the clips in accordance with the present invention.
Figure 5:
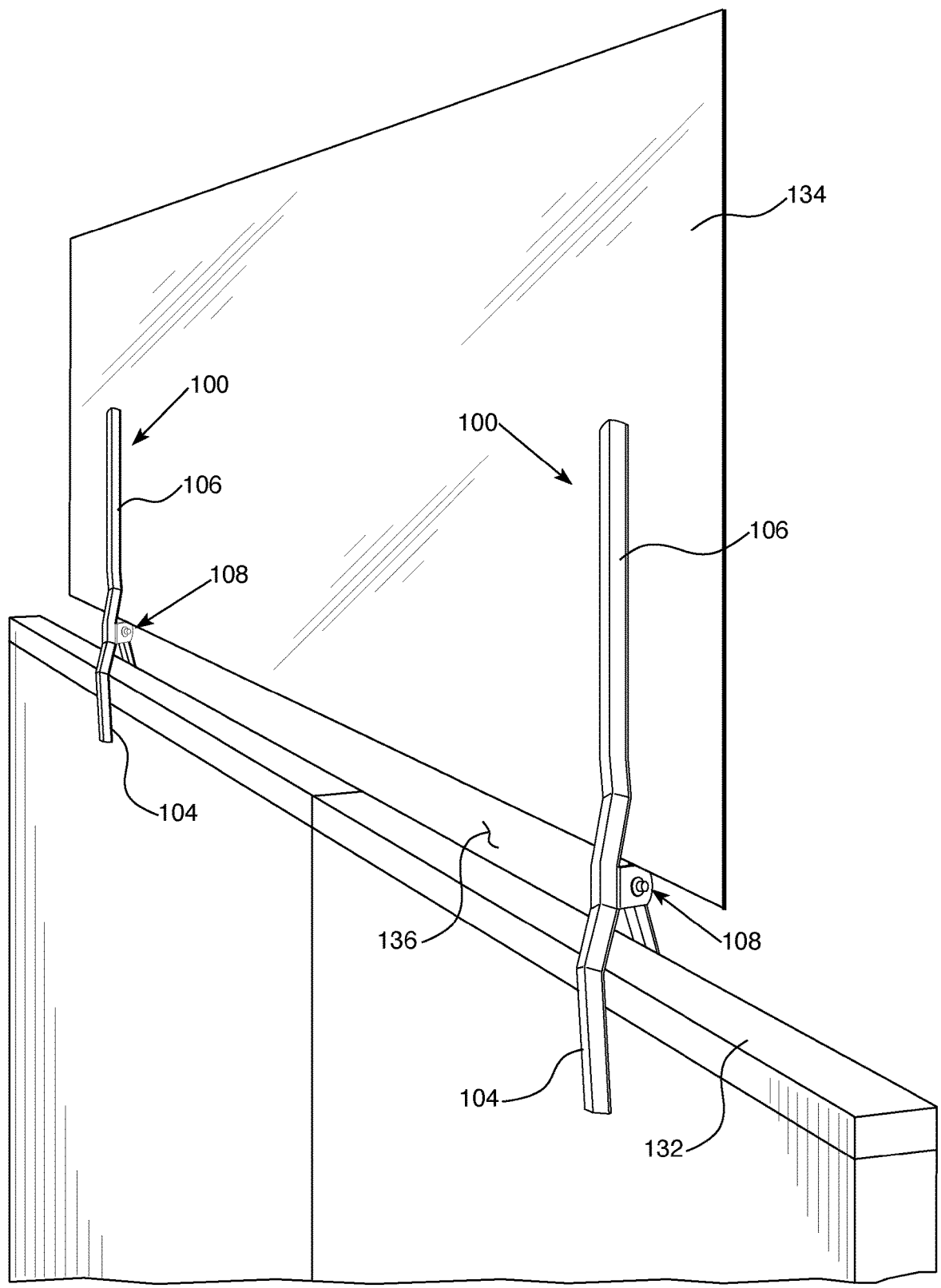
Figure 6:
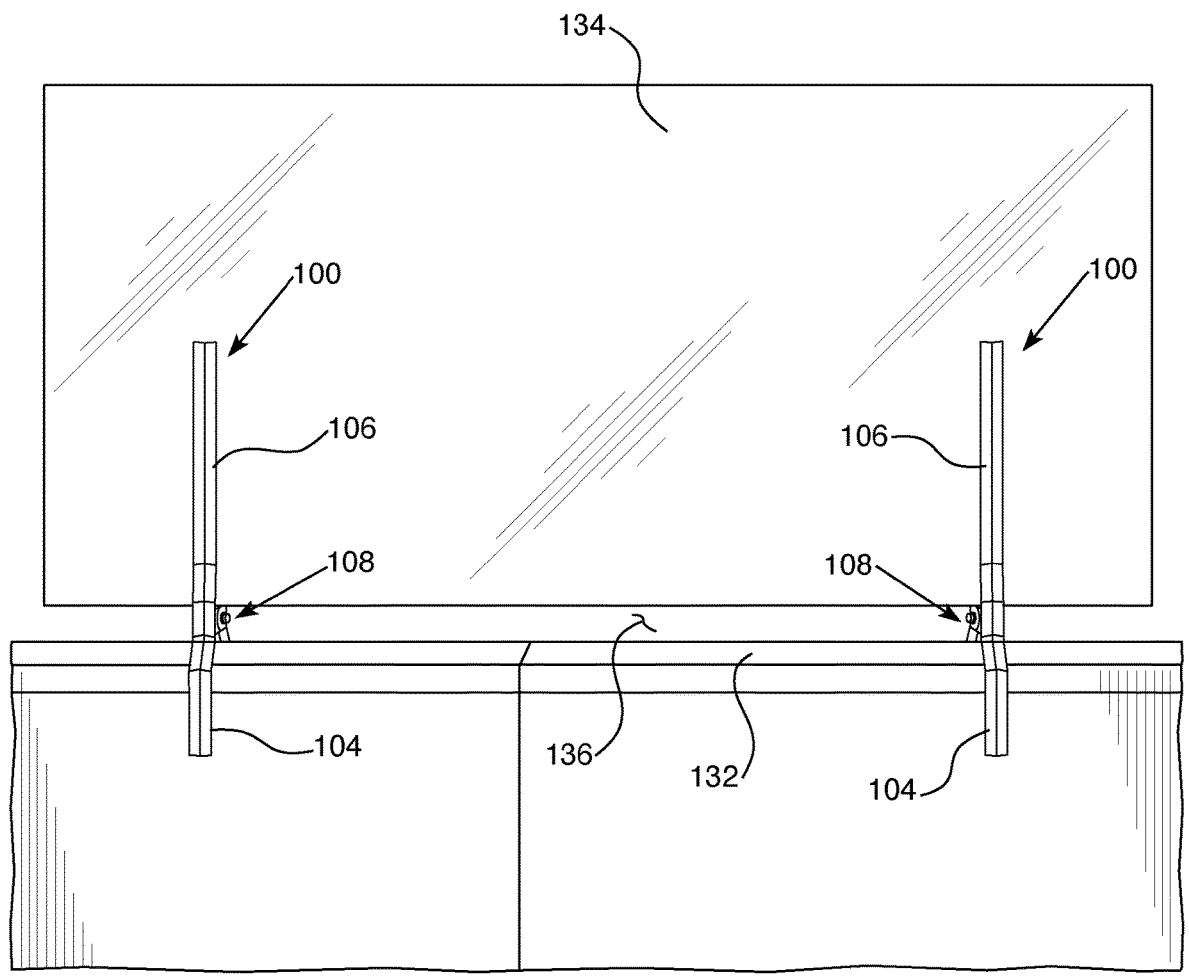

FIGS. 4-6 depict the cubicle wall extension element 134 removably coupled to the cubicle wall 132 with a space 136 therebetween. That is, the attachment portions 108 of the clips 100 are positioned between the cubicle wall extension element 134 and the cubicle wall 132.

Figure 7:
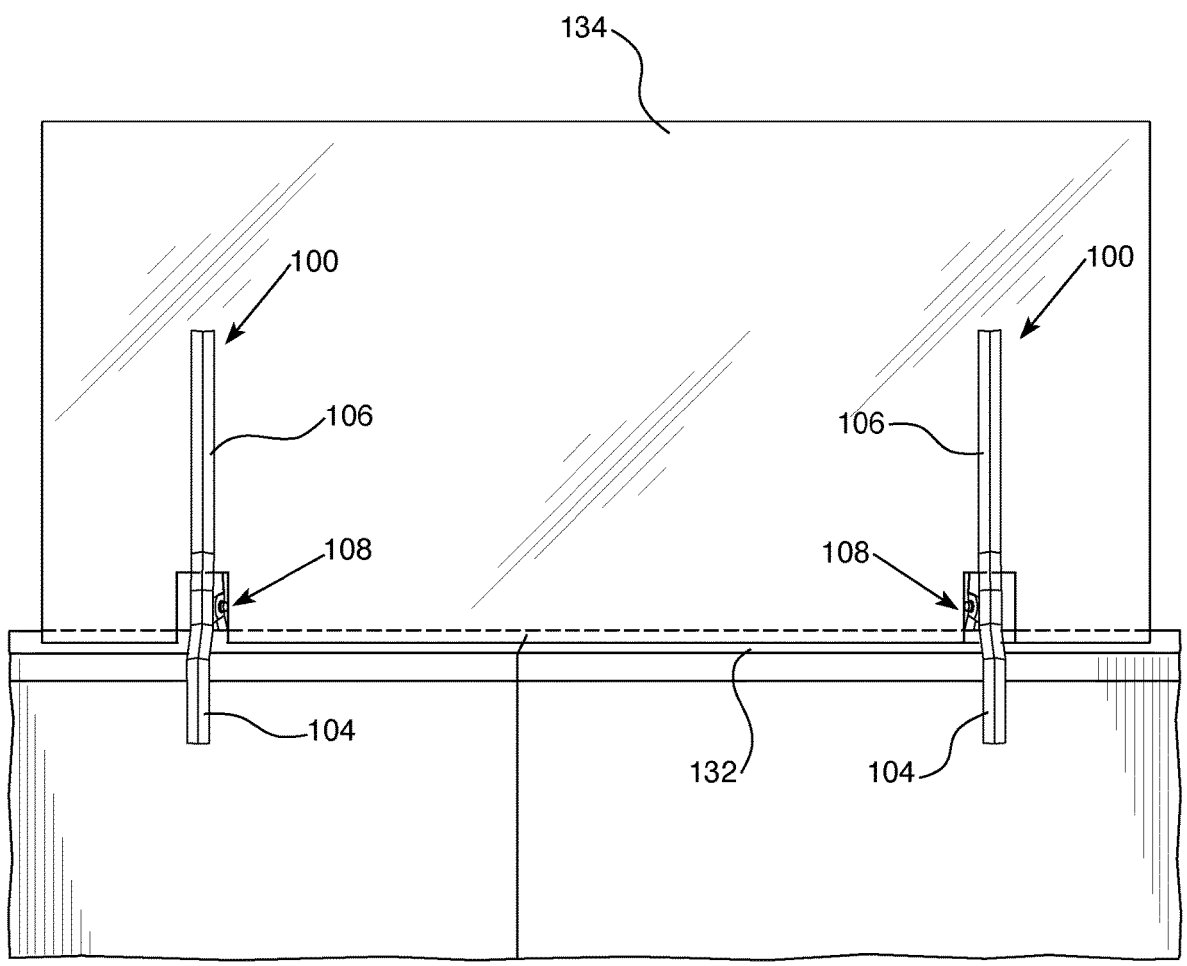

In another configuration, shown in FIG. 7, the cubicle wall extension element 134 includes notches 138 therein to accommodate the attachment portions 108 of the clips 100. The configuration minimizes or eliminates the gap between the cubicle wall extension element 134 and the cubicle wall 132. As such, the clips 100 may be provided in a kit that includes the cubicle wall extension element 134 having the notches 138 cut therein. The kit may include a cubicle wall extension element 134 having a size, shape, and material chosen by the user or customer and two or more clips 100 that are sized and shaped to hold the cubicle wall extension element 134 in position on the cubicle wall 132. The cubicle wall extension element 134 included in the kit may have the notches 138 cut therein to accommodate the clips 100.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the invention. This description should be read to include one or at least one, and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation, and details of the method and apparatus disclosed herein without departing from the spirit and scope defined herein.

What is claimed is:

1. A clip for removably attaching a cubicle wall extension element to a top surface of a cubicle wall, wherein the clip comprises:
    two elongate arms rotatably coupled together at an attachment portion, wherein each one of the arms comprises an upper portion and a lower portion, wherein the attachment portion is disposed between the upper portion and the lower portion;
    a space between the lower portions of the arms, wherein the space is sized and shaped to fit the top surface of the cubicle wall therein; and
    a torsion spring disposed between the two arms so that the two arms are spring biased to have a resting configuration in which the lower portions of the arms are open and the upper portions of the arms are in a closed position in which the upper portions of the arms are in contact with each other along substantially their entire lengths,
    wherein each one of the two elongate arms further comprises a first angled portion between the lower portion and the attachment portion, and a second angled portion between the attachment portion and the upper portion, and
    wherein the upper portions of the two elongate arms are each 12 to 18 inches long.

2. The clip of claim 1, wherein the upper portions of the arms and the lower portions of the arms are substantially parallel to each other.

3. The clip of claim 2, wherein the first angled portion and the second angled portion are at an angle relative to the upper portion and the lower portion, and wherein the angle is between 20 and 40 degrees.

4. The clip of claim 1, wherein the torsion spring comprises a helical portion and two legs, wherein the two legs are in contact with the first angled portions of the two elongate arms.

5. The clip of claim 1, wherein the attachment portion comprises a shaft that is disposed through a center of the torsion spring and is rotatably coupled to the two elongate arms.

6. The clip of claim 1, wherein the attachment portion comprises rivets that attach the two arms together.

7. The clip of claim 1, wherein the lower portions of the two arms are 5 to 8 inches long.

8. The clip of claim 1, wherein the space between the lower portions is 1.5 to 3.75 inches wide.

9. The clip of claim 1, wherein the two elongate arms are made of a material that is configured to be bent into a desired position.

* * * * *